US009112408B2

(12) United States Patent
Blau

(10) Patent No.: US 9,112,408 B2
(45) Date of Patent: Aug. 18, 2015

(54) PROVISION OF AN OUTPUT VOLTAGE FROM A WIDE RANGE VARIABLE AND LOW INPUT VOLTAGE

(75) Inventor: Steffen Blau, Titschendorf-Wurzbach (DE)

(73) Assignee: PULS GMBH, Munich (DE)

(*) Notice: Subject to any disclaimer, the term of this patent is extended or adjusted under 35 U.S.C. 154(b) by 0 days.

(21) Appl. No.: 13/091,948

(22) Filed: Apr. 21, 2011

(65) Prior Publication Data

US 2011/0260704 A1 Oct. 27, 2011

(30) Foreign Application Priority Data

Apr. 23, 2010 (DE) .......................... 10 2010 028 149

(51) Int. Cl.
| | |
|---|---|
| *H02M 3/156* | (2006.01) |
| *H02J 1/10* | (2006.01) |
| *H02M 3/158* | (2006.01) |
| *H02M 1/32* | (2007.01) |
| *H02M 1/36* | (2007.01) |
| *H02M 1/00* | (2007.01) |

(52) U.S. Cl.
CPC ............... *H02M 3/158* (2013.01); *H02M 1/32* (2013.01); *H02M 1/36* (2013.01); *H02M 2001/007* (2013.01)

(58) Field of Classification Search
CPC ......... H02M 1/32; H02M 1/36; H02M 3/156; H02M 3/158; H02M 2001/007; H02M 2001/0006

USPC ........ 363/49, 65, 78; 323/238, 266, 268, 282, 323/284, 299, 321, 351, 222, 271, 272, 288, 323/901, 909; 307/43, 80, 82
See application file for complete search history.

(56) References Cited

U.S. PATENT DOCUMENTS

| 4,322,724 | A | 3/1982 | Grudzinski | |
| 6,242,920 | B1 * | 6/2001 | Nelson et al. | 324/427 |
| 6,919,758 | B1 | 7/2005 | Preslar et al. | |
| 7,332,897 | B2 * | 2/2008 | Lee et al. | 323/222 |
| 2001/0046144 | A1 * | 11/2001 | Murabayashi et al. | 363/69 |
| 2002/0145339 | A1 * | 10/2002 | Liu et al. | 307/77 |

(Continued)

*Primary Examiner* — Timothy J Dole
*Assistant Examiner* — Ivan Laboy Andino
(74) *Attorney, Agent, or Firm* — Merchant & Gould P.C.

(57) ABSTRACT

A circuit arrangement for providing an output voltage and/or an output current from an input voltage $V_{in}$, comprising: a first switching converter (10) having a storage element (120) and a first switching element (110), adapted to charge the storage element (120) from the input voltage $V_{in}$ up to a threshold voltage and a second switching converter (20) having a second switching element (210) adapted to start with the threshold voltage at the storage element (120) and to provide the output voltage $V_{out}$ and/or the output current $I_{out}$ from the input voltage $V_{in}$, wherein the first switching element (110) has a minimum driving voltage, at and above which the first switching element (110) can perform switching operations, the second switching element (210) has a minimum driving voltage, at and above which the second switching element (210) can perform switching operations, and wherein the minimum driving voltage of the first switching element is smaller than the minimum driving voltage of the second switching element.

9 Claims, 4 Drawing Sheets

(56) References Cited

U.S. PATENT DOCUMENTS

2008/0062729 A1* 3/2008 Kanai et al. .................. 363/49
2009/0309568 A1* 12/2009 Hisano .......................... 323/311
2010/0177538 A1* 7/2010 Scherr ........................... 363/39

* cited by examiner

PROVISION OF AN OUTPUT VOLTAGE FROM A WIDE RANGE VARIABLE AND LOW INPUT VOLTAGE

This application claims benefit of Serial No. DE 10 2010 028 149.2, filed 23 Apr. 2010 in Germany and which application is incorporated herein by reference. To the extent appropriate, a claim of priority is made to the above disclosed application.

BACKGROUND OF THE INVENTION

The invention pertains to a circuit arrangement for providing a stable output voltage and/or output current from an input voltage which is variable over a wide range and might also assume exceptionally low values from case to case, and as a possible application of such circuit, a redundancy module having active decoupling components.

In systems and automation engineering, as well as in other fields of electronics, one usually employs internal supply voltages of about 3V to about 60V. Internal supply voltages are those voltages which are required by the electrical consumers which are connected to the internal supply network of the respective apparatus or the respective system, for their proper functioning and which are provided by one or more current supply unit(s), which is (are) also connected to the internal supply network.

The energy supply capabilities of such current supply units are limited in any case. In the case of an overload or a short circuit on the supply lines, the supply voltages, which are provided by the connected current supply unit(s), will drop in accordance with their overload characteristics; in the case of a short circuit, oftentimes to values below 1V. At drops of the supply voltage below certain values, which differ depending on the consumer, some consumers will turn off in a controlled manner, other consumers will stop functioning properly at first and will cease functioning completely only at a further decrease of the voltage supply. In case of a short circuit, at voltages below 1V, none of the usual/known (designed for nominal voltages of 3V or above) consumers continue functioning.

For increasing the reliability for critical applications, multiple current supply units are often connected in parallel/redundantly, in order to be able to ensure the supply of the connected consumers and, in this manner, of the entire apparatus resp. the entire system, even in case of a failure of one (or single) current supply unit(s). In doing so, depending on the reliability requirements of the apparatuses resp. systems, at least two, but often also more current supply units are connected together by means of so called redundancy modules.

The redundancy modules include an output stage, which, in case of an unbalance (i.e. unequally high output voltages of the feeding current supply units) or in case of a failure of one (or single) connected current supply unit(s), prevents a current return flow from the normally functioning current supply unit(s) into the current supply unit, which is defective or has an undervoltage, and which also can completely disconnect defective current supply units from the consumers in case of a disturbance or a short circuit. In the simplest case such output stage is realized by a diode. For reasons of energy efficiency, but often also for thermal reasons, it is sensible or necessary to realize such output stages with active semiconductor components instead of simple diodes. Circuits with active semiconductor components require a sufficiently high supply voltage, which, for proper functioning, often also needs to be sufficiently stable within limits.

Such supply voltage is neither available in case of an overload or a short circuit on the supply line(s) nor in case of disturbances of the feeding current supply unit(s).

If the proper functioning of the redundancy modules or other critical consumers, (e.g. monitoring and signalling units), which are connected to the internal supply network, is required also in case of such fault, the supply voltage, which is required by them, can be provided by independent current supplies, such as a) additional current supply units having separate supply lines for the case of a fault, b) batteries/accumulators, c) electrolytic capacitor buffer circuits (usually having so-called "gold-caps"), d) solar cells or also e) recent methods of energy harvesting. The aforementioned solutions have the disadvantage that they either require a) comparably elaborate additional electronics and, in addition to this, additional cabling or b) regular maintenance. In case of c), the functionality is limited to a short period of time and in the case of d), to certain environmental conditions. Furthermore, the solutions c), d) and especially e) are limited in their energy supply capabilities and thus cannot be employed in many cases.

For the mentioned failure case, in which the supply voltage, due to an overload or a short circuit, drops below its nominal value, two variants of failure cases are to be distinguished: case a) overload or short circuit already at the time of turning on; in this case the supply voltage never attains its nominal value or at least a voltage value which can be used by the connected consumers—and case b) overload or short circuit from within the normal operation; in this case the supply voltage drops more or less rapidly to values which are invalidly low for the connected consumers.

If one tries, on the basis of known circuits for supplying consumers from very small voltages, to find a solution, which is suitable for both preceding cases at the same time, the same problems arise again and again. Circuits, which are suitable to, from very small input voltages such as 1V and smaller, generate output voltages for common consumers in the amount of about 3V to about 60V, cannot handle, at the same inputs, at which, as laid out, the very small source voltages are applied, as an alternative operating case, also high voltages of 20V . . . 40V . . . 60V. These circuits are furthermore generally only laid out for smaller currents than about 1 A and smaller voltages than about 20V—in any case not suitable to fulfil all requirements with regard to the input voltage stability, output voltage stability and the current supply capability at the same time, without adding a considerable amount of additional electronics.

SUMMARY OF THE INVENTION

It is an object of the present invention to provide a circuit arrangement, which, over a wide, gapless input voltage range, and especially beginning at very low voltages below 1V, can supply a sufficiently large output voltage and/or an output current, and is therefore suitable to reliably supply single critical consumers, even in cases of failures as described above.

It is furthermore an object of the present invention, as a possible application of the aforementioned circuit arrangements, to provide a redundancy module, which functions properly, even when the supply voltage drops due to an overload or a short circuit at the output, without falling back to additional current supplies.

These objects are solved by the subject matter of the independent claims. Further advantageous embodiments are described in the dependent claims.

In accordance with a first aspect of the present invention, a circuit arrangement is provided, for generating an output voltage and/or an output current from an input voltage, which comprises: a first switching converter having a storage element and a first switching element, adapted to charge the storage element from the input voltage up to a threshold voltage and a second switching converter having a second switching element, adapted to start at and above a determined threshold voltage at the storage element and to generate the output voltage and/or the output current from the input voltage, wherein the first switching element has a minimum driving voltage, at and above which the first switching element can perform switching operations and the second switching element has a minimum driving voltage, at and above which the second switching element can perform switching operations, and wherein the minimum driving voltage of the first switching element is smaller than the minimum driving voltage of the second switching element.

In accordance with a further aspect of the present invention, a redundancy module is provided, for supplying consumers at the module output from the input voltages at least two module inputs, which comprises an output stage, which is connected upstream of the module output, and a circuit arrangement in accordance with the first aspect or a corresponding embodiment of the present invention.

In accordance with the present invention, an output voltage and/or an output current can be provided reliably from an input voltage, which can vary over a wide voltage range. In doing so, the input voltage can in particular also drop to a very low level—for example in case of a disturbance or a short circuit—such that, as a result, only an input voltage in a range below 1V, often in the range from 100 mV to 600 mV, is available. At the same time, the circuit arrangement in accordance with the present invention can, however, without further separating means, in normal operation, that is when applying higher input voltages such as in the range of 3V to 60V, also remain at the input voltage. This considerably simplifies the incorporation of the circuit arrangement in accordance with the present invention into other electronic circuits, such as the realisation of the redundancy module in accordance with the present invention.

Since the minimum driving voltage of the first switching element is lower than the minimum driving voltage of the second switching element, the first switching converter can start from smaller input voltage values to charge up the storage element than switching converter 2. Upon reaching the threshold value at the storage element, the second switching converter can start and ensure the provision of the output voltage and/or the output current. It can do this even on the basis of an even lower input voltage than required for the start of the first switching converter, since it can, once put into working order, generate the necessary minimum driving voltage of the second switching element itself.

This input voltage, which is even lower compared to the start-up voltage and which is required for the continued operation of the circuit arrangement, can especially be advantageous when the input voltage drops to very small values, at which the first switching converter would not start itself anymore, it can, however, in the process of the dropping of the input voltage, start the second switching converter, even before the input voltage has dropped to extremely small values. Moreover, the second switching element of the second switching converter can be adapted such, that it has, compared to the first switching element of the first switching converter, an increased minimum driving voltage, but can, correspondingly to the (load-) requirements of the second switching converter with regard to the output voltage and output current, have less conducting state losses and switching losses.

In this manner, in accordance with a first embodiment of the present invention, the first switching element can be implemented as a bipolar silicon transistor, which has a lower minimum driving voltage and can thus already start at lower input voltages, while the second switching element can be implemented as a MOSFET which, although requiring a relatively high minimum driving voltage, has smaller losses in operation.

BRIEF DESCRIPTION OF THE DRAWINGS

Advantageous embodiments of the present invention are described in the attached figures in more detail. In this regard

DETAILED DESCRIPTION OF THE PREFERRED EMBODIMENT(S)

Figure 1A:
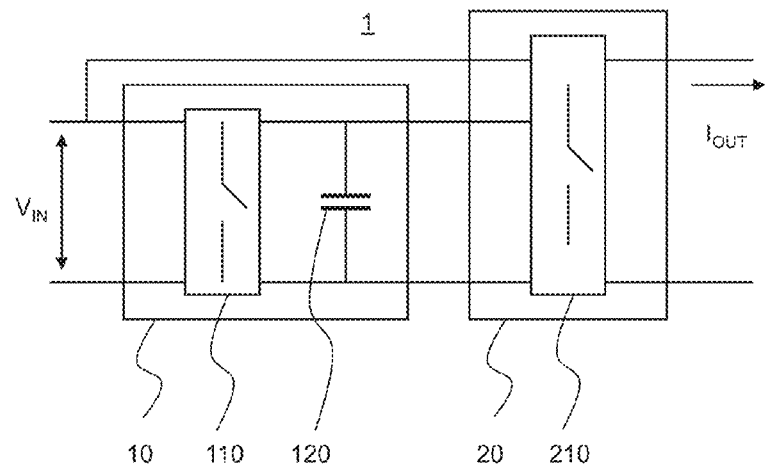
FIG. 1A shows a circuit arrangement in accordance with a first embodiment of the present invention.

FIG. 1A shows a circuit arrangement 1 in accordance with a first embodiment of the present invention. In accordance with the present invention, the circuit arrangement 1 comprises a first switching converter 10 (also called start converter) and a second switching converter 20 (also called main converter). The start converter 10 generates, from the available input voltage $V_{in}$, an auxiliary voltage for the main converter 20. The start of the main converter 20 takes place at a sufficiently large auxiliary voltage. In this regard, the function of the main converter 20 can consist in the generation of a supply voltage for a further consumer, such as an output stage of a redundancy module or any other control circuit. In this manner, the main converter 20 can, when required, ensure such auxiliary voltage supply, although the available input voltage $V_{in}$ is not sufficient for starting the main converter 20.

Here, the start converter 10 comprises a storage element 120, such as a capacitor, and a first switching element 110 in order to provide the auxiliary voltage for the main converter 20 from $V_{in}$ by means of a switching converter. The first switching element 110 is a switching element, which can, even at low voltages, already switch reliably, which, for example, a bipolar silicon transistor is capable of doing at voltages of typically 600 mV (thermal tolerance range: 400 mV to 800 mV) at small collector currents. The second switching converter 20 comprises a second switching element 210, which is adapted to start with the threshold voltage at the storage element 120 and to then provide, from the input voltage $V_{in}$, the output voltage $V_{out}$ and/or the output current $I_{out}$.

Figure 1B:
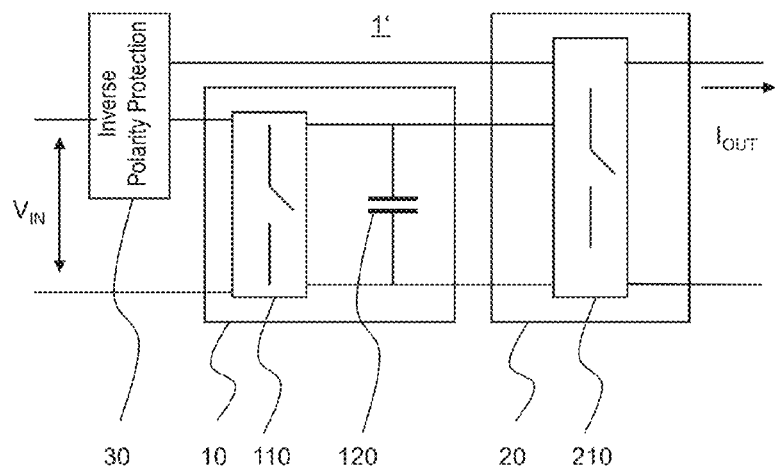
FIG. 1B shows a circuit arrangement in accordance with a second embodiment of the present invention.

FIG. 1B shows a circuit arrangement in accordance with a second embodiment of the present invention. In addition to the circuit arrangement 1 of FIG. 1A, an inverse-polarity-protection 30 is provided which, in case of a inverse polarity of the input voltage, constitutes an effective protection of the remaining component groups and consumers. This inverse-polarity protection 30 can become effective in case of an operating error or a switching of the polarity when connecting to the input voltage—or in case of any other inverse-polarity.

Figure 2A:
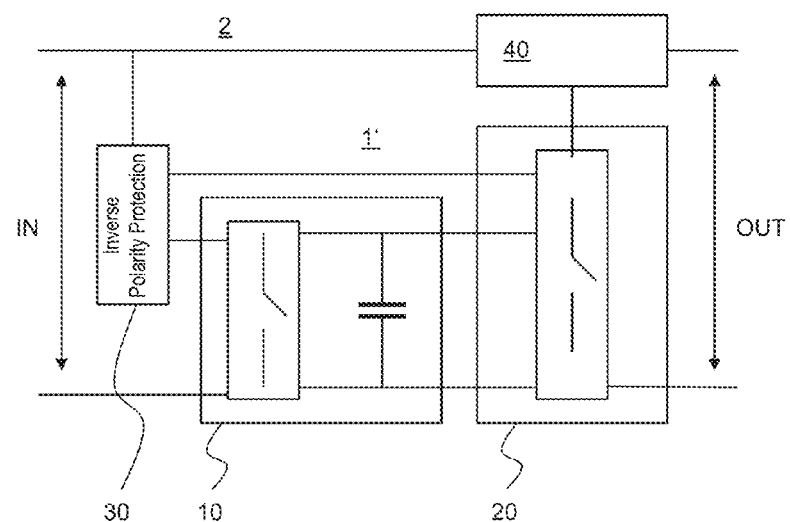
FIG. 2A shows a redundancy module in accordance with a third embodiment of the present invention.

FIG. 2A shows a redundancy module 2 in accordance with a third embodiment of the present invention. Here, the circuit arrangement in accordance with the present invention can be employed. It is an object in this regard to generate a voltage for the supply of semiconductor components or similar in a redundancy module. Here, the function of a module 2 can consist in the decoupling of feeding current supplies, which supply common loads or consumers.

More specifically, within the redundancy module 2 an output stage 40 is provided, which is connected between the supply voltage IN ($V_{in}$ in FIGS. 1A and 1B) and the output OUT. Within the output stage 40, as an example of a decoupling element, a MOSFET 410 is employed, which, due to a corresponding controlling, has the same effect as a decoupling diode. The advantage of the MOSFET 410 is the possible reduction of conducting-state losses compared to a diode. If required, the effective conductive-state resistant can further be reduced by a parallel connection of MOSFETS.

The voltage at the output (at OUT) of the redundancy module 2 corresponds to the input voltage (at IN), reduced by the voltage of the decoupling MOSFET 410 of the output stage 40 in forward direction. In accordance with the current-voltage-characteristics of the feeding current supplies, the voltage at the output of the redundancy module can drop in case of an overload with regard to the nominal voltage (for example 24V) or, in case of a short circuit, even reach 0V. The input voltage of the module 2 thus varies in compliance with the voltage at the output and can, in particular operating cases (controlling errors) also lie above the nominal voltage.

The supply of the output stage 40, e.g. the supply of the gate of the employed decoupling MOSFET 410 thus has to be ensured over a wide input voltage range. Due to the circuit arrangement 1, 1' in accordance with the present invention, it is possible in this application to enable a voltage range at the output of 0V to 40V for the redundancy module 2 having the employed components. In accordance with the conducting state voltage of the decoupling MOSFETS 410 at forward current, the input voltage is up to about 100 mV higher.

The basic setup of a channel in the output stage 40 of the redundancy module 2 is also shown in FIG. 2A. The supply voltage generated by the main converter 20 is used in the output stage 40 for driving the gate of the decoupling MOSFET 410. Here, this MOSFET 410 can also already comprise an integrated diode 420.

A controller within the output stage 40 handles the additional function of gate voltage controlling for preventing return currents in operating cases having voltages at the output (at OUT) higher than the input voltage (at IN). This case can e.g. occur, when a feeding current supply fails. The decoupling of the individual input sources is thus ensured. Furthermore, the gate voltage can be controlled in certain operating cases (short circuit at the output OUT) to a minimum voltage.

Since the voltage at the output of the redundancy module can drop close to 0V in case of an overload or a short circuit, only this small value is thus available as input voltage of the module 2. When connecting the current limited input voltage and having a short circuit at the output, a voltage value is applied to the input, which is determined by the forward voltage of the internal body-diode 420 of the MOSFET 410 and the voltage drop, which is caused by the short circuit current at the entire loss resistance of a channel of the redundancy module 2.

This voltage is the source voltage for the start converter 10, which generates an auxiliary voltage for the main converter 20 by means of a step-up circuit. Thereby, the main converter 20 is operable and can supply the output voltage (supply voltage) for the output stage 40 and the own auxiliary supply. In accordance with the driving of the gate of the decoupling MOSFET 410, the MOSFET 410 takes on the current of the internal body-diode 420, wherein the voltage drop over the component decreases to a value, which is given by the on-resistance ($R_{on}$ of the MOSFET 410) and the short circuit current.

Controlling of the gate voltage provides, in case of a short circuit at the output OUT, by controlling the on-resistance of the MOSFET 410, a minimum voltage at the input IN, which ensures the functioning of the main converter 20. This voltage can be about 0.1V and can, depending on the component choice, even be smaller.

Under normal conditions, however, higher voltages in the range of 3V to 60V are applied to the input IN of the redundancy module, commonly used in an industrial setting are 24V to 28V, wherein the functioning of the component groups is then usually adapted for voltages up to 40V. The circuit arrangement for the gate supply of the MOSFET 410 in accordance with the present invention thus comprises, in an advantageous manner, a voltage range of 1:400, which is substantially extended compared to common circuits, without having to employ separating elements for the protection of components, such as the first circuit element 110.

The inverse-polarity protection 30 for the input IN is effective over the entire input voltage range. Due to the arrangement in series to the start converter 10 resp. main converter 20, it is possible to achieve, in case of an inverse polarity at the input IN, a smaller error current compared to the employment of an anti-parallel protection diode at the input. Furthermore, a series connection of an inverse-polarity protection diode to the component groups start converter 10 and main converter 20 using the small input voltages up to 100 mV is impossible, even when employing special diodes.

In summary, the output stage 40 thus provides the supply for the consumer at output OUT. Controlling functions for current and voltage, evaluation and display tasks as well as measurements, which influence the voltage at the output of the redundancy module within the output stage 40 and/or the module 2 can be ensured in an advantageous manner over a wide input voltage range and even in case of a failure resp. a short circuit, by providing the circuit arrangement 1, 1' in accordance with the present invention.

Figure 2B:
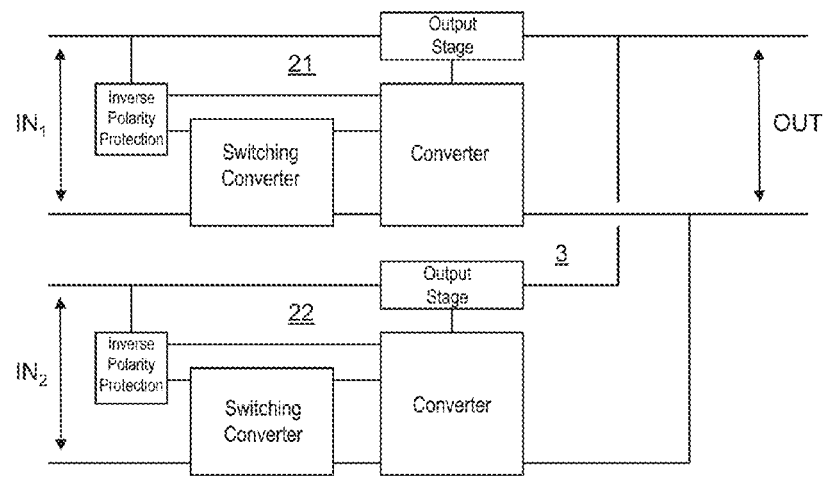
FIG. 2B shows redundancy modules in use, in accordance with a fourth embodiment of the present invention.

FIG. 2B shows redundancy modules in use in accordance with a fourth embodiment of the present invention. As shown, a first redundancy module 21 and a second redundancy module 22 are provided, in order to provide multiple voltage supplies $IN_1$, $IN_2$ in a redundant manner to a consumer resp. to a common supply output OUT.

Figure 3A:
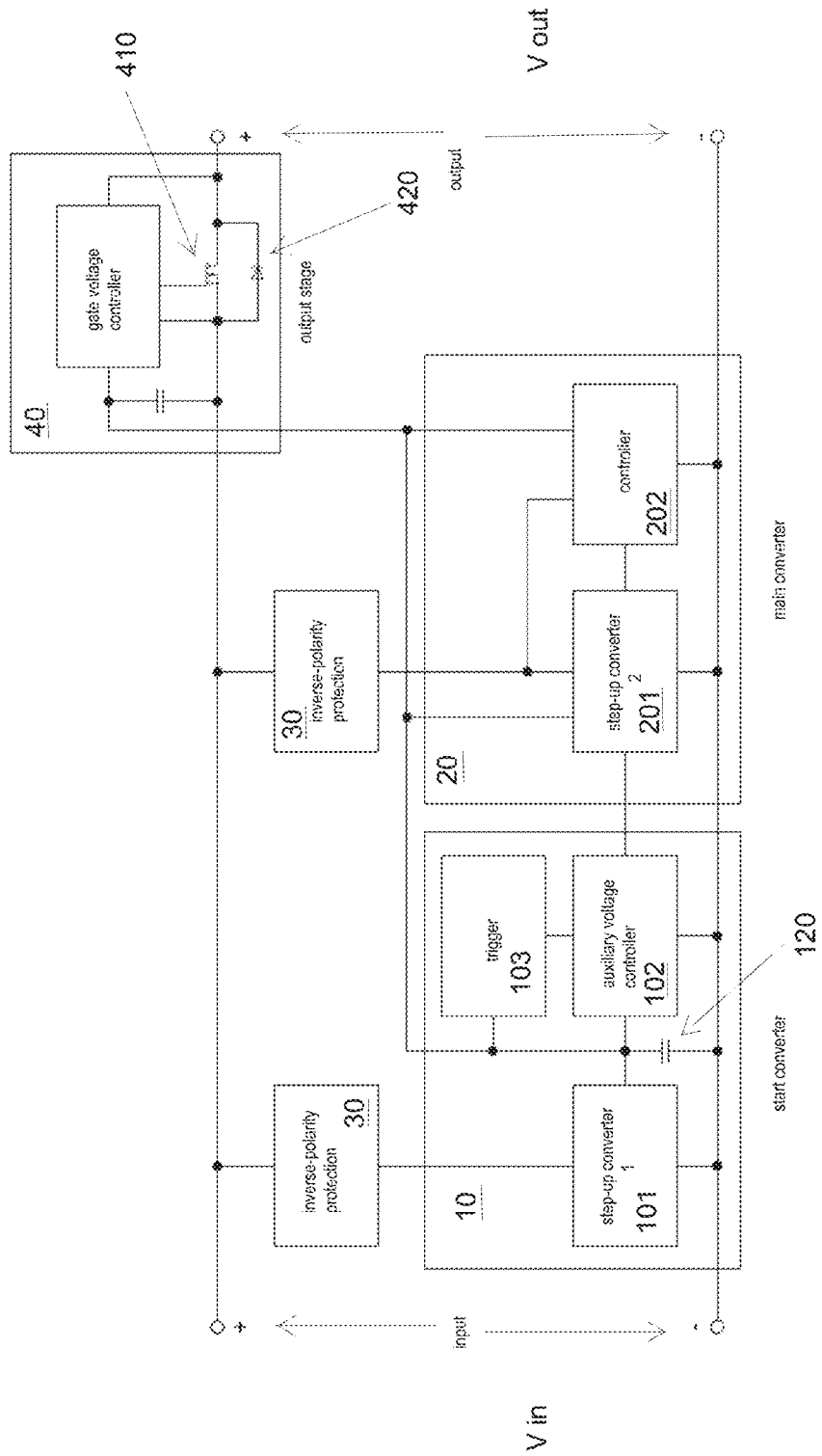
FIG. 3A shows the circuit configuration of a redundancy module in accordance with a fifth embodiment of the present invention.
Figure 3B:
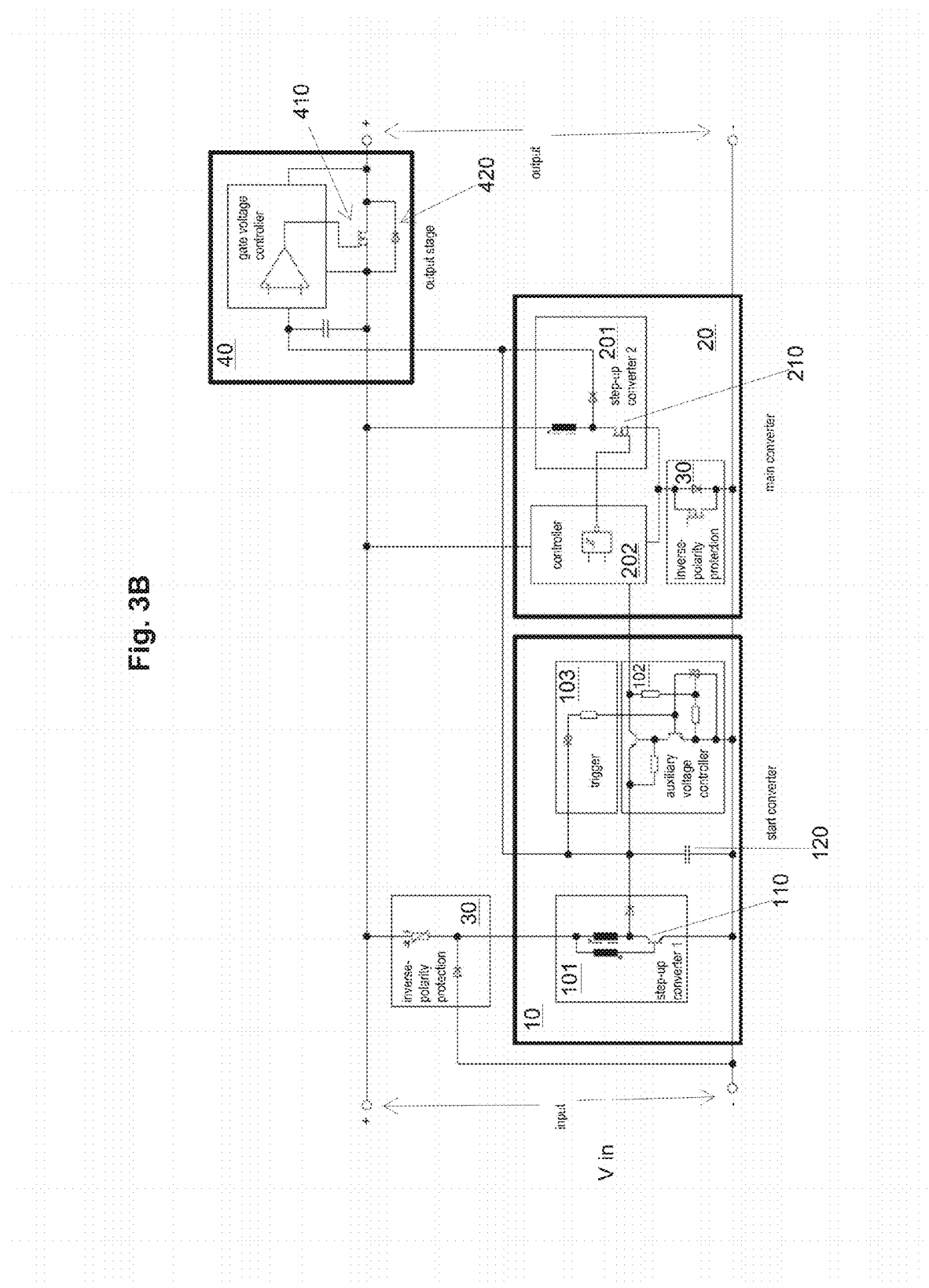
FIG. 3B shows the circuit configuration of a redundancy module in accordance with a sixth embodiment of the present invention.

FIGS. 3A and 3B show the circuit configuration of a redundancy module in accordance with further embodiments of the present invention. The component group start converter 10 consists of a clocked converter (step-up converter 101), an energy storage 120 and an auxiliary voltage controller 102 having a start enabler (trigger 103) for the main converter 20. The converter 101 is realized self-timed and charges, from the available input voltage, the energy storage (capacitor 120). The input voltage, which is required for this purpose, is, due to the employed silicon transistor, at a minimum driving voltage of about 600 mV (thermal tolerance range 400 mV to 800 mV). The use of a transistor with a different semiconductor material and a lower threshold voltage of the base-emitter path can reduce the minimum input voltage for the starting of the main converter 20 even further.

The component group main converter 20 is started by the enabling of trigger 103 for the auxiliary voltage controller, when the energy storage 120 is charged up sufficiently. The functionality of the main converter 20 for generating the output voltage is, after the start, also possible at input voltages even lower than 600 mV (thermal tolerance range: 400 mV to 800 mV). The upper input voltage range is determined by the employed components of the main converter 20 and the start converter 10.

In the component group main converter 20 is a clocked converter (step-up converter 201) and its controller 202. This converter can be realized with or without galvanic separation, different types of converters are possible (step-up converter, flyback converter, etc.).

At the output of the main converter component group 20, the raw output voltage is provided, which can be influenced in the component group output stage 40 in accordance with the specification for the load resp. the consumer. Possible parts of the output stage 40 are smoothing, filter, switching and controlling elements for the limitation of current or voltage or turning off the output in certain cases. Furthermore, a display function with regard to the operating states can be realized by the output stage 40.

The invention claimed is:

1. A redundancy module for providing a decoupled voltage to a module output from an input voltage, the module being operable with a gapless input voltage range beginning at low input voltages associated with an overload or short circuit at the output; the module comprising:
an output stage connected upstream of the module output;
a circuit arrangement providing an output voltage and/or an output current from the input voltage as a supply to the output stage;
the circuit arrangement comprising:
a first switching converter having a storage element and a first switching element, adapted to charge the storage element from the input voltage up to a threshold voltage, wherein the operable input voltage of the first switching element is variable from 0.4 volts up to 60 volts;
a second switching converter having a second switching element, adapted to start at and above the threshold voltage at the storage element and to provide the output voltage in a range of 0.1 volts up to 60 volts; and
an inverse-polarity protection between the input voltage and the first and second switching converter, wherein said inverse-polarity protection comprises a series connection of a diode and a positive temperature coefficient (PTC) resistor, said diode being in parallel with the first switching converter, and a transistor in series with the second switching converter;
wherein the first switching element has a minimum driving voltage, at and above which the first switching element can perform switching operations, the second switching element has a minimum driving voltage, at and above which the second switching element can perform switching operations, and wherein the minimum driving voltage of the first switching element is smaller than the minimum driving voltage of the second switching element; and
wherein the first switching converter is operable to start the second switching converter, and the second switching converter is operable to provide the supply to the output stage at voltages of 0.1 volts up to 60 volts.

2. The redundancy module according to claim 1, wherein the first switching element is a bipolar silicon transistor.

3. The redundancy module according to claim 1, wherein the second switching element is a MOSFET.

4. The redundancy module according to claim 1, wherein the start of the first switching converter takes place at an input voltage, which reaches or exceeds the minimum driving voltage of the first switching element.

5. The redundancy module in accordance with claim 1, wherein the output stage comprises means for smoothing, for filtering, for switching and/or for controlling the output voltage and/or the output current.

6. Redundancy module in accordance with claim 1, wherein the redundancy module is implemented as a DIN rail unit.

7. The redundancy module according to claim 1, wherein the redundancy module is configured so that an arrangement of two or more redundancy modules is adapted for redundant supply at the output from two or more different voltage sources.

8. The redundancy module according to claim 1, wherein the minimum driving voltage of the first switching element is in a range of 400 mV to 800 mV and the minimum driving voltage of the second switching element is in a range of 1.5V to 5V.

9. The redundancy module according to claim 1, wherein the first switching converter and the second switching converter are configured so that the second switching converter starts when the first switching converter has charged-up the storage element to at least the minimum driving voltage of the second switching element, and the second switching converter continues operation at voltages below the minimum driving voltages of the first switching element and the second switching element.

* * * * *